United States Patent [19]

Theodosiou et al.

[11] 4,408,297

[45] Oct. 4, 1983

[54] REDUCTION IN MAXIMUM TIME UNCERTAINTY OF PAIRED TIME SIGNALS

[75] Inventors: George E. Theodosiou, West Chicago; John W. Dawson, Clarendon Hills, both of Ill.

[73] Assignee: The United States of America as represented by the U.S. Department of Energy, Washington, D.C.

[21] Appl. No.: 233,533

[22] Filed: Feb. 11, 1981

[51] Int. Cl.³ .............................................. G01T 1/20
[52] U.S. Cl. ................................... 364/569; 250/369; 364/555; 377/15
[58] Field of Search ............................... 364/569, 555; 250/363 R, 366, 369, 328; 235/92 T, 92 F, 92 TF, 92 FQ

[56] References Cited

U.S. PATENT DOCUMENTS

| | | |
|---|---|---|
| 3,578,960 | 5/1971 | Georgi et al. |
| 3,588,699 | 6/1971 | Pysnik ............................ 364/569 X |
| 3,646,347 | 2/1972 | Farmer et al. |
| 3,769,508 | 4/1972 | Friedman |
| 3,769,508 | 10/1973 | Brunnett et al. |
| 3,947,684 | 3/1976 | Ikebe et al. .......................... 250/369 |
| 4,031,392 | 6/1977 | Giraud et al. .................. 250/369 X |
| 4,071,761 | 1/1978 | Horrocks .............................. 250/369 |
| 4,164,648 | 8/1979 | Chu ................................. 235/92 FQ |
| 4,180,736 | 12/1979 | Goodman ....................... 250/363 R |
| 4,181,855 | 1/1980 | Horrocks ........................ 250/363 R |

*Primary Examiner*—Edward J. Wise

[57] ABSTRACT

Reduction in the maximum time uncertainty ($t_{max} - t_{min}$) of a series of paired time signals $t_1$ and $t_2$ varying between two input terminals and representative of a series of single events where $t_1 \leq t_2$ and $t_1 + t_2$ equals a constant, is carried out with a circuit utilizing a combination of OR and AND gates as signal selecting means and one or more time delays to increase the minimum value ($t_{min}$) of the first signal $t_1$ closer to $t_{max}$ and thereby reduce the difference. The circuit may utilize a plurality of stages to reduce the uncertainty by factors of 20–800.

10 Claims, 6 Drawing Figures

REDUCTION IN MAXIMUM TIME UNCERTAINTY OF PAIRED TIME SIGNALS

CONTRACTUAL ORIGIN OF THE INVENTION

The present invention relates to the reduction in the time uncertainty of signals from multiple detection systems and more particularly to the reduction in the maximum time uncertainty between two or more signals representative of single events. The United States Government has rights in this invention pursuant to Contract No. W-31-109-ENG-38 between the U.S. Department of Energy and the University of Chicago representing Argonne National Laboratory.

BACKGROUND OF THE INVENTION

As described in U.S. Pat. No. 4,181,855 and other sources of the art, measurements associated with radioactivity and other events are commonly carried out with scintillation counters having a pair of detectors to produce a series of paired signals representative of the passage of particles passing through the counter tube between the detectors. With large scintillation counters used in time measurements associated with the passage of elementary particles at high velocities, the accuracy of the measurements are limited by the time uncertainty between the detector signals associated with the difference in time that the signals in the counter tube reach and trigger the detectors.

Additional details associated with scintillation counters and the time uncertainty factor may be provided by reference to FIG. 1. In FIG. 1, a scintillation counter is illustrated with detectors at each end to generate a pair of signals representative of the passage of a particle through the tube. With a series of particles passing through the tube at various points, the signals at each of the detectors will vary in order of time and will have a maximum uncertainty or difference equal to L/v or $\Delta t_o$. These signals may be represented by the following:

$$t_A = t_o + x/v$$

$$t_B = t_o + [(L-x)/v]$$

$$t_A + t_B = 2t_o + L/v = 2t_o + \Delta t_o$$

where "$t_A$" and "$t_B$" are time measurements at the first and second ends of the tube, "$t_o$" is a constant associated with the time that the particle passes through the tube and the time for the signal to pass through the counter lightguides and photomultipliers, "L" is the length of the tube, "x" is the point along the tube where the particle passes, and "v" is the effective velocity for the light signal (generated by the passage of the particle) to propagate in the counter to reach the detectors. As the particles pass through the counter tube at various points along its length, a series of paired signals are generated at the two detectors representative of the series of individual particles or single events. When the particles pass through the tube at a distance "x" equal or less than L/2, the signal $t_1$ at that end will be first or equal in order of time to the signal $t_2$ at the other end. When "x" is greater than L/2, the signals $t_1$ and $t_2$ will be reversed respective to the terminals A and B and $t_1$ and $t_2$ will vary between the two detector outputs and will have a maximum uncertainty or difference in time of $\Delta t_o$ associated with the length of the counter tube. Particularly with high speed particles, the time uncertainty between the signals limits the usefulness of the data.

In addition to the maximum time uncertainty or difference between the signals $t_1$ and $t_2$ in each signal pair, the value of $t_2$ will also vary between a maximum $t_2$ equal to L/v and L/2v or between $\Delta t_o$ and $\Delta t_o/2$ resulting in a second uncertainty. With elementary particles traveling at high velocities, reduction in these uncertainties is desirable to improve the usefulness of the output signals or data.

One object of this invention is the reduction in the maximum time uncertainty between a pair of signals representative of a single event. A second object is the reduction in the maximum time uncertainty of the second signal in time of a pair of signals representative of a single event. Another object is the improvement in usefulness of data generated by the passage of elementary particles through scintillation counters. A further object of the invention is the selection of signals first and second in the order of time from signal pairs with varying orders of time. An additional object of the invention is a logic circuit with AND and OR gates for time selection of the signals from detectors associated with scintillation counters. Other objects, advantages and novel features of the invention will be set forth in part in the description that follows, and in part will become apparent to those skilled in the art upon examination of the following or may be learned by practice of the invention.

This invention provides a method and apparatus for reducing the maximum time uncertainty or difference $\Delta t_o$ between paired time signals $t_1$ and $t_2$ in a series of paired signals representative of a series of single events where the signals $t_1$ and $t_2$ vary between two terminals. The invention further provides a method and apparatus for reducing the maximum time uncertainty of the second signal $t_2$ in a series of paired signals where $t_2$ is dependent on the relationships $t_1 \leq t_2$ and $t_1 + t_2$ equals a constant. A maximum value ($t_{max}$) for the signal $t_2$ also usually equals L/v with $t_1$ being at its minimum value ($t_{min}$).

The apparatus of the invention includes input and output means, including a pair of input terminals for providing a series of paired signals $t_1$ and $t_2$ to the input terminals. At each terminal, the signals will vary between $t_1$ and $t_2$ where $t_1 \leq t_2$ and $t_1 + t_2$ equals a constant. The signals $t_1$ and $t_2$ vary within a predetermined limit of $t_{min}$ and $t_{max}$ whose difference is equal to $\Delta t_o$. The apparatus includes circuit means with logic means interconnecting the input terminals to the output means for each stage or the entire circuit, and include means for adding a time delay to the signals $t_1$ in the series to increase $t_{min}$ to $t_x$ where $t_{min} < t_x < t_{max}$, and means for selecting signals between $t_x$ and $t_{max}$ whose maximum uncertainty is less than $\Delta t_o$. The addition of time delay may be carried out either prior to or subsequent to the selection process. The time delay is equal to a fraction of $\Delta t_o$ with the value depending on the particular circuit. With a series circuit, the time delay preferably is equal to about $\Delta t_o/2$. A single stage may provide significant reduction or several stages may be used. With a plurality of stages in a series, the time delay for each stage is reduced by a factor of two for each succeeding stage resulting in progressively reduced time uncertainties between the signals with the lower limit progressively approaching the upper limit $t_{max}$.

The logic means includes first and second selecting means for selecting the first and second signals with the first selecting means including one or more OR gates and the second selecting means including one or more AND gates. In some embodiments as illustrated in the drawing, combinations of OR and AND gates are used for each selecting operation.

In addition to reducing the maximum time uncertainty $\Delta t_o$ of the signal pairs, the time delay at least in some embodiments also serves to increase the value of the second signal in those circuits where its maximum value is less than its original maximum value $t_{max}$. By use of the invention, the maximum time uncertainty of signal pairs may be reduced by factors of 2, 4, 16 and values of 250-800 and above. In one embodiment (as generally illustrated by FIG. 3) with a $\Delta t_o$ equal to approximately 4.2 nsec., the maximum time uncertainty has been reduced to a value of approximately 70 psec. This and other embodiments are further discussed below in the detailed description.

BRIEF DESCRIPTION OF THE DRAWINGS

FIG. 3 is a logic diagram of one embodiment of the invention.

DETAILED DESCRIPTION OF THE INVENTION

Figure 1:
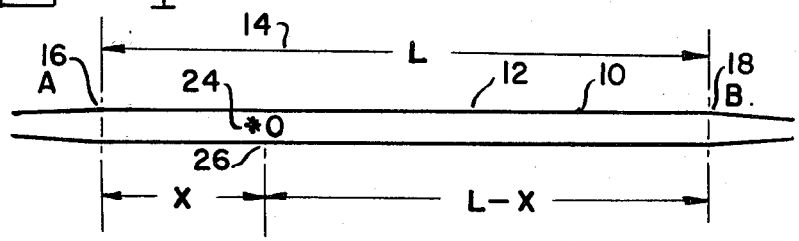
FIG. 1 is a pictorial representation of a scintillation counter of the prior art.

As illustrated in the drawings and described in this specification, the invention relates to (1) the reduction in maximum time uncertainty or time difference $\Delta t_o$ between paired signals of a series of signal pairs representative of a series of single events and (2) the reduction in time uncertainty of the second signal in time of the signal pairs. By this method and through the use of apparatus with the invention, the maximum time uncertainty between two signals representing a single event may be reduced until the signals are extremely close together while the maximum value $t_{max}$ of the later signal in order of time remains essentially the same as that for the input signal and may serve as a reference point for the data. Logic diagrams have been illustrated to show the essentials of the associated circuits.

As background, FIG. 1 shows a pictorial representation of a scintillation counter 10 of the prior art with a counter tube 12 having a length 14 with a pair of detectors 16 and 18 at opposite ends A and B. A particle 24 is represented as passing through tube 12 at a point 26 equal to "x" as measured from end A with the distance from end B being equal to L-x. Counter tubes 12 vary in length with a typical value being about 126 cm. resulting in a maximum time delay or uncertainty in the order of about 4.2 nsec.

Figure 2:
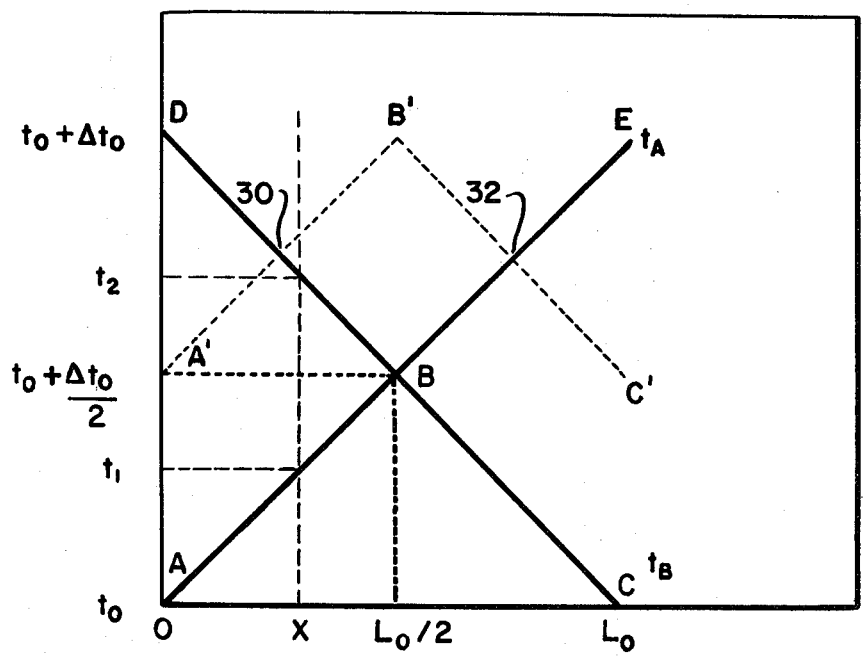
FIG. 2 is a graph of the signal response for each detector of a scintillation counter with respect to position along the counter tube.

In the graph of FIG. 2, the signals generated by the detectors 16 and 18 of tube 12 are illustrated by line ABE for signal $t_A$ at end A and by line CBD for signal $t_B$ at end B. The signals $t_1$ being equal or first in time are represented by lines ABC while the signals $t_2$ are represented by lines DBE resulting in the relationships that $t_1 \leq t_2$ and $t_1 + t_2$ equals a constant. Since the particles may pass through tube 12 along its entire length, the signals $t_1$ may be generated either at end A or end B and usually vary between the ends. When the particle passes through the tube at one end, the maximum difference of $\Delta t_o$ exists between the signals with the signal $t_2$ equal to $t_{max}$ and the signal $t_1$ equal to $t_{min}$.

If a time delay equal to a fraction of $\Delta t_o$ (about 0.1-0.9 $\Delta t_o$) and preferably equal to about $\Delta t_o/2$ is added to the portion ABC, that portion is shifted by $\Delta t_o/2$ to the new portion A'B'C' with the total time uncertainty being reduced from $\Delta t_o$ to $\Delta t_o/2$. Selection of $t_1$ may be carried out by a first-in-time selector represented by an OR gate as described below. If the resulting signal from the addition of the time delay is fed along with the signal $t_2$ to a second-in-time selector represented by an AND gate (as illustrated in FIG. 3), an output signal will be developed with values represented by the lines D-30-B'-32-E. In this process, the maximum time uncertainty is reduced to a new limit between $t_x$ (representing the new minimum value) and $t_{max}$ (represented by point D) and equal to $\Delta t_o/4$. As illustrated in FIG. 2, the variation in the second signal $t_2$ has also been reduced since the lower limit has been changed from point B to point 30 with the maximum time uncertainty for signal $t_2$ being reduced by a factor of two. By the use of progressive stages of reduction in maximum time uncertainty, the lower limits $t_{min}$ progressively approach $t_{max}$ or point D.

Figure 5:
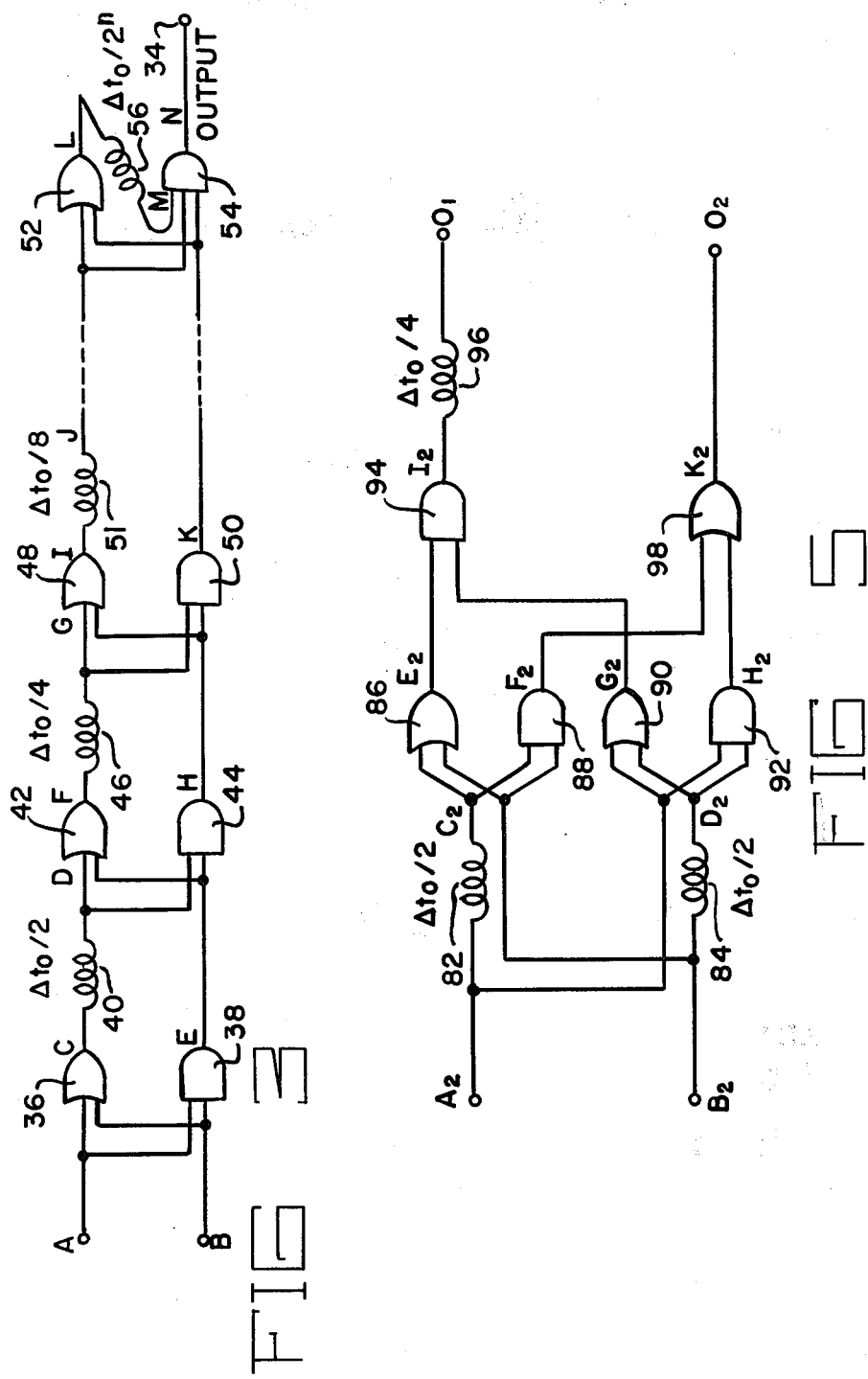
FIG. 5 is a logic diagram of a third embodiment of the invention.
Figure 6:
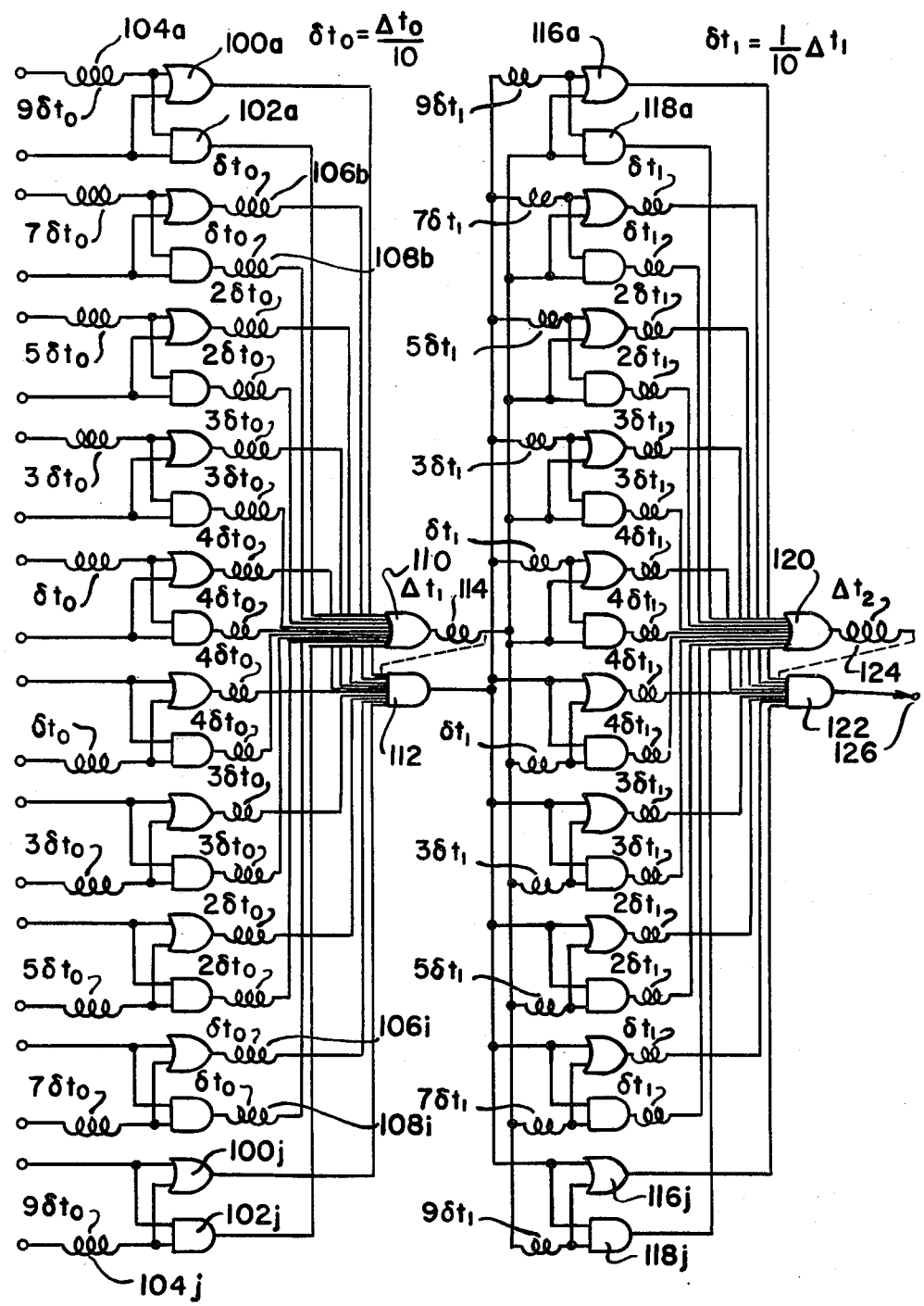
FIG. 6 is a logic diagram of a fourth embodiment of the invention.

Another shift in the signals may be carried out by adding the time delay to a signal from one of the terminals as illustrated by the logic diagrams of FIG. 5 and FIG. 6. The addition of a time delay equal to a fraction of $\Delta t_o$ and in some instances a value of $\Delta t_o/2$ to the signal $t_A$ shifts signals represented by line ABE to line A'B' (and its upper extension) resulting in the maximum uncertainty between signals $t_1$ from line A'B' and signals $t_2$ from line DB being equal to $\Delta t_o/2$. Addition of a similar time delay to the signal $t_B$ results in a similar reduction in the uncertainty between signal $t_1$ represented by line B'C' and the signal $t_2$ represented by line BE.

In FIG. 3, a logic diagram is illustrated with a series of stages of reducing the maximum time uncertainty $\Delta t_o$ between paired signals $t_1$ and $t_2$ at two terminals A and B of an input. An output 34 is provided for the logic diagram or the connections between stages may be considered as the output depending on the reduction being considered. Circuit means with logic means interconnect terminals A and B with output 34 and include logic means represented by OR gate 36 and AND gate 38 for the first stage. Means are provided for adding time delay 40 equal to $\Delta t_o/2$ (with $\Delta t_o$ equalling the initial time uncertainty) to the signal $t_1$ selected by OR gate 36 while signal $t_2$ is selected by AND gate 38. The addition means are illustrated by time delay 40 being included in the logic diagram after OR gate 36. Means are further provided for selecting singals within the reduced limit resulting from the addition of the time delay to the first signal $t_1$. In FIG. 3, the signals from the time delay 40 and AND gate 38 are applied to OR gate 42 and AND gate 44. At OR gate 42, the first signal in time is selected to which time delay 46 equal to $\frac{1}{2}(\Delta t_o/2)$ is added for shifting the signal closer to $t_{max}$. At AND gate 44, the second signal is passed through the gate to result in a maximum time uncertainty of $\Delta t_o/4$. The third stage is represented by OR gate 48, AND gate 50 and time delay 51 of $\Delta t_o/8$. The final "n" stage is represented by OR gate 52, AND gate 54 and time delay 56 whose output is applied to AND gate 54. At the final stage, the time delay is equal to $\Delta t_o/2^n$ where n is equal to the number of stages. In one test to provide improved time-of-flight resolution for an experiment, 36 channels of the circuit based on the logic diagram of FIG. 3 were constructed. $\Delta t_o$ for 20 channels was 4.2 ns and for 16 channels was 5.6 ns. Time delays were provided by RG-174 cable, cut to length and soldered onto the circuit. The calculated value of $\Delta t_{o4}$ for a $\Delta t_o$ of 4.2 ns was 0.13 ns with the measured values ranging between 0.1 and 0.2 ns.

Table I is provided below to provide an illustration of the operation of each of three stages of the diagram of FIG. 3 based on an arbitrary time factor of 64 for $\Delta t_o$ and for the predetermined limit of the two signals.

TABLE I

| A | B | C | $\frac{\Delta t_o}{2}$ | D | E | $\Delta t_{DE}$ | F | $\frac{\Delta t_o}{4}$ | G | H | $\Delta t_{GH}$ | I | $\frac{\Delta t_o}{8}$ | J | K | $\Delta t_{JK}$ |
|---|---|---|---|---|---|---|---|---|---|---|---|---|---|---|---|---|
| 0 | 64 | 0 | 32 | 32 | 64 | 32 | 32 | 16 | 48 | 64 | 16 | 48 | 8 | 56 | 64 | 8 |
| 8 | 56 | 8 | 32 | 40 | 56 | 16 | 40 | 16 | 56 | 56 | 0 | 56 | 8 | 64 | 56 | 8 |
| 16 | 48 | 16 | 32 | 48 | 48 | 0 | 48 | 16 | 64 | 48 | 16 | 48 | 8 | 56 | 64 | 8 |
| 24 | 40 | 24 | 32 | 56 | 40 | 16 | 40 | 16 | 56 | 56 | 0 | 56 | 8 | 64 | 56 | 8 |
| 32 | 32 | 32 | 32 | 64 | 32 | 32 | 16 | 48 | 64 | 16 | 48 | 8 | 56 | 64 | 8 |
| 40 | 24 | 24 | 32 | 56 | 40 | 16 | 40 | 16 | 56 | 56 | 0 | 56 | 8 | 64 | 56 | 8 |
| 48 | 16 | 16 | 32 | 48 | 48 | 0 | 48 | 16 | 64 | 48 | 16 | 48 | 8 | 56 | 64 | 8 |
| 56 | 8 | 8 | 32 | 40 | 56 | 16 | 40 | 16 | 56 | 56 | 0 | 56 | 8 | 64 | 56 | 8 |
| 64 | 0 | 0 | 32 | 32 | 64 | 32 | 32 | 16 | 48 | 64 | 16 | 48 | 8 | 56 | 64 | 8 |

As noted in Table I, the original total time uncertainty is 64 units, which in the first stage is reduced by a factor of 2 to a maximum of 32 units. In the second stage, the total time uncertainty is further reduced by a factor of 2 to 16 units and in the third stage is reduced to a value of 8 units. The maximum value $t_{max}$ of the second signal for each stage remains at 64 units.

For the embodiment illustrated by FIG. 3, one important property is that the time range for the two outputs will have a fixed value of $\Delta t_o/2$ determined uniquely by the amount of delay at the OR gate output and independent of the input's true range provided it is smaller or equal to $\Delta t_o$. Further as stages are added, the general equation for an n-stage system is equal to the following:

$$\Delta t_{out} = \Delta t_n = \Delta t_o/2^n$$

where n is equal to the number of stages.

sented by OR gate 60, AND gate 62, and time delay 64, the first signal $t_1$ (i.e., lines ABC of FIG. 2) is selected by OR gate 60, is increased by $\Delta t_o/2$ by time delay 64 (i.e., lines A'B'C' of FIG. 2) and then applied to AND gate 62 simultaneously with the two original signals. Selection by AND gate 62 is the later signal between signal $t_2$ and the sum of $\Delta t_o/2$ and the signal $t_1$ resulting in the signals represented by lines D-30-B'-32-E of FIG. 2. In the stage represented by AND gate 66, OR gate 68 and time delays 70 and 72, the signal $t_2$, (i.e., lines DBE of FIG. 2) is selected by AND gate 66 and applied simultaneously with the first signal $t_1$ increased by $\Delta t_o/2$ (lines A'B'C' of FIG. 2) to OR gate 68 which selects the first of the signals resulting in the lines A'-30-B-32-C' of FIG. 2. Time delay 74 of $\Delta t_o/4$ is added to the selected signal to shift the diagram so that points 30 and 32 are equal to point D or $t_{max}$.

At the stage represented by OR gate 76, AND gate 78 and time delay 80, the first signals are selected by OR gate 76, increased by $\Delta t_o/8$ by time delay 80 and applied to AND gate 78 which selects signals whose maximum time uncertainty is $\Delta t_o/10$. Table II below provides illustrative data to explain the operation of the circuit represented by the logic diagram.

As shown in Table II, the total time uncertainty of the two signals are reduced from a value of 64 units by a factor of 4 in each parallel stage to a value of 16 units. In the second stage, the uncertainty is further reduced to a value of 4 units. Analysis of the data by using line shifts representing time delays reveals that between the nine peaks of 64 units, there are eight minimum values of 60. If the number of steps of change for A and B were increased, the minimum values of 60 would appear.

TABLE II

| $A_1$ | $B_1$ | $\frac{\Delta t_o}{2}$ | $C_1$ | $D_1$ | $E_1$ | $F_1$ | $\frac{\Delta t_o}{4}$ | $G_1$ | H | $\frac{\Delta t_o}{2}$ | $I_1$ | $J_1$ | $K_1$ | $\frac{\Delta t_o}{8}$ | L | M | $N_{time}^{min}$ |
|---|---|---|---|---|---|---|---|---|---|---|---|---|---|---|---|---|---|
| 0 | 64 | 32 | 32 | 96 | 64 | 32 | 16 | 48 | 0 | 32 | 32 | 64 | 48 | 8 | 56 | 64 | |
| 8 | 56 | 32 | 40 | 88 | 56 | 40 | 16 | 56 | 8 | 32 | 40 | 56 | 56 | 8 | 64 | 64 | 60 |
| 16 | 48 | 32 | 48 | 80 | 48 | 48 | 16 | 64 | 16 | 32 | 48 | 48 | 48 | 8 | 56 | 64 | 60 |
| 24 | 40 | 32 | 56 | 72 | 40 | 40 | 16 | 56 | 24 | 32 | 56 | 56 | 56 | 8 | 64 | 64 | 60 |
| 32 | 32 | 32 | 64 | 64 | 32 | 32 | 16 | 48 | 32 | 32 | 64 | 64 | 48 | 8 | 56 | 64 | 60 |
| 40 | 24 | 32 | 72 | 56 | 40 | 40 | 16 | 56 | 24 | 32 | 56 | 56 | 56 | 8 | 64 | 64 | 60 |
| 48 | 16 | 32 | 80 | 48 | 48 | 48 | 16 | 64 | 16 | 32 | 48 | 48 | 48 | 8 | 56 | 64 | 60 |
| 56 | 8 | 32 | 88 | 40 | 56 | 40 | 16 | 56 | 8 | 32 | 40 | 56 | 56 | 8 | 64 | 64 | 60 |
| 64 | 0 | 32 | 96 | 32 | 64 | 32 | 16 | 48 | 0 | 32 | 32 | 64 | 48 | 8 | 56 | 64 | 60 |

Figure 4:
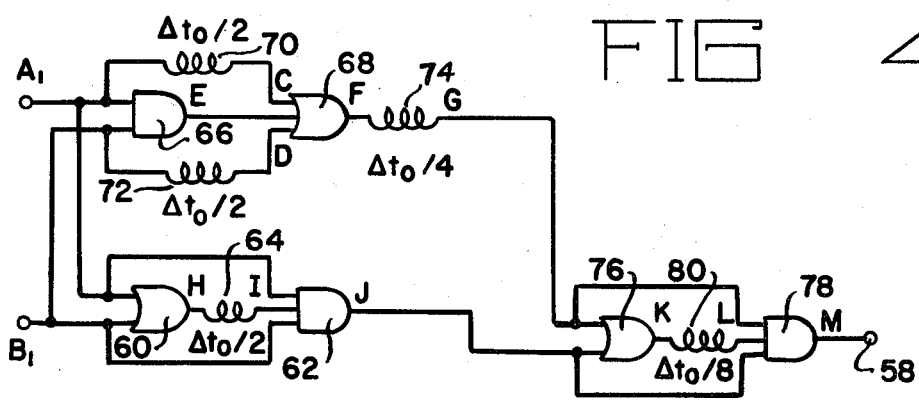
FIG. 4 is a logic diagram of a second embodiment of the invention.

In FIG. 4, input terminals $A_1$ and $B_1$ provide the series of paired signals $t_1$ and $t_2$ to the circuit means represented by the two parallel stages and the final stage providing a signal to output 58. In the stage repre- In the logic diagram of FIG. 5, input terminals $A_2$ and $B_2$ provide a series of paired signals $t_1$ and $t_2$ which are split with time delays 82 and 84 of $\Delta t_o/2$ being added to one of the two signals $t_A$ and signals $t_B$. Signal $t_A$ plus $\Delta t_o/2$ and signal $t_B$ are applied to OR gate 86 and AND gate 88 in parallel while signal $t_B$ plus $\Delta t_o/2$ and signal $t_A$ are applied to OR gate 90 and AND gate 92. Outputs from OR gates 86 and 90 are applied to AND gate 94 whose output is increased by $\Delta t_o/4$ by time delay 96. Outputs from AND gates 88 and 92 are applied to OR gate 98. The selection and time delay addition process for time delay 82 and OR gate 86 operate to shift line ABE (FIG. 2) to A'B' (as extended) with OR gate 86 selecting signals in lines A'-30-B. Time delay 82 for AND gate 88 shifts line DBC to line B'C' (as extended) and AND gate 88 selects the signals in lines B'-32-E. The two signals in lines A'-30-B and B-32-C' are applied to AND gate 94 which selects those signals without the lower extensions. Points 30 and 32 are then increased by $\Delta t_o/4$ to equal point D. In a similar manner, the outputs from AND gates 88 and 92 are applied to OR gate 98 which eliminates the upper extensions. Table III provides illustrative data to explain the operation of the logic diagram representing the circuit.

TABLE III

| $A_2$ | $B_2$ | $\frac{\Delta t_o}{2}$ | $C_2$ | $D_2$ | $E_2$ | $F_2$ | $G_2$ | $H_2$ | $I_2$ | $\frac{\Delta t_o}{4}$ | $J_2$ | $K_2$ | $\Delta t_{J_2K_2}$ |
|---|---|---|---|---|---|---|---|---|---|---|---|---|---|
| 0 | 64 | 32 | 32 | 96 | 32 | 64 | 0 | 96 | 32 | 16 | 48 | 64 | 16 |
| 8 | 56 | 32 | 40 | 88 | 40 | 56 | 8 | 88 | 40 | 16 | 56 | 56 | 0 |
| 16 | 48 | 32 | 48 | 80 | 48 | 48 | 16 | 80 | 48 | 16 | 64 | 48 | 16 |
| 24 | 40 | 32 | 56 | 72 | 40 | 56 | 24 | 72 | 40 | 16 | 56 | 56 | 0 |
| 32 | 32 | 32 | 64 | 64 | 32 | 64 | 32 | 64 | 32 | 16 | 48 | 64 | 16 |
| 40 | 24 | 32 | 72 | 56 | 24 | 72 | 40 | 56 | 40 | 16 | 56 | 56 | 0 |
| 48 | 16 | 32 | 80 | 48 | 16 | 80 | 48 | 48 | 48 | 16 | 64 | 48 | 16 |
| 56 | 8 | 32 | 88 | 40 | 8 | 88 | 40 | 56 | 40 | 16 | 56 | 56 | 0 |
| 64 | 0 | 32 | 96 | 32 | 0 | 96 | 32 | 64 | 32 | 16 | 48 | 64 | 16 |

As Table III shows, the total time uncertainty for the circuit of FIG. 5 is reduced by a factor of 4 from an initial 64 units to a value of 16 units with the maximum value of the second signal in time remaining at 64 units. While some of the values are initially increased over the initial maximum value of 64 and some are in the low end of the range, these in the high end are rejected by the subsequent OR gate and those in the low end are rejected by the subsequent AND gate. The resultant maximum value ($t_{max}$) for the later signal remains at 64.

In practice, the extent that the maximum time uncertainty may be reduced is limited by the inherent delay of the AND and OR gates and the circuit paths connecting them in series. This time delay will decrease proportionally with the number of stages and the number of logic elements connected in series to the signals. Where reduction in time jitter is desired, a parallel circuit as illustrated in FIG. 6 may be utilized. As illustrated, the system includes ten pairs of OR and AND gates in parallel in each of individual stages connected to a combination of AND and OR gates which minimizes the number of gates that the signals pass through in series while providing a selective reduction in time uncertainty for the signals. The circuit is particularly advantageous for time measurements utilizing large scintillation counters where the time uncertainty introduced by the finite propagation velocity of the produced signal may be significant compared to the desired time resolution. Essentially the system involves a two-stage design where the first stage includes a plurality of selective AND and OR gates with their outputs fed to OR and AND gates. The result is that selected portions of the outputs from each of the parallel stages are combined in the OR and AND gates to provide a pair of signals with a total time uncertainty of $\Delta t_o/20$. By repeating the basic single stage design, the total time uncertainty for a second stage is reduced to a total uncertainty of $\Delta t_o 1800$. A general equation is provided by the following:

$$\Delta t_f = \Delta t_o/(2^{n+1}m^n)$$

Where $\Delta t_f$ is the final maximum time uncertainty, n is the number of stages and m is the number of pairs of gates in each stage.

In FIG. 6, the logic diagram of FIG. 5 has been expanded to include ten pairs of OR gates 100(a-j) and ten pairs of AND gates 102(a-j) with first time delays 104(a-j) applied prior to the gates and second time delays 106(b-i) applied for the OR gates and second time delays 108(b-i) applied for the AND gates. The first time delays 104(a-j) differ by $2\Delta t_o/10$ between each pair of gates and changes from an initial $9\Delta t_o/10$ at OR gate 100a to $\Delta t_o/10$ at OR gate 100e to $9\Delta t_o/10$ at AND gate 102j while the second time delays increase by $\Delta t_o/10$ from zero delay at the first pair of gates to $4\Delta t_o/10$ at the fifth and sixth pair of gates and then decrease to zero at the tenth pair of gates.

As illustrated, the signals from the ten OR gates 100(a-j) are applied to AND gate 112 while the signals from the ten AND gates 102(a-j) are applied to OR gate 110 whose signal is increased in time by time delay 114 having a value of $\Delta t_1$ equal to $\Delta t_o/20$. The signal is then applied to AND gate 112. In the second stage, ten additional pairs of OR gates 116(a-j) and AND gate 118(a-j) and associated time delays are used. The outputs (following the time delay) are applied to OR gate 120 or AND gate 122. The time delay $\Delta t_2$ following OR gate 120 is equal to $\Delta t_o/20 \times 20$.

The first time delay causes selective shifts of the lines ABE and DBC in FIG. 2 resulting in the signals from the central part of tube 12 having less of a delay. The second delay increases those signals so that the maximum value of each segment is at $t_{max}$ resulting in an overall value in time uncertainty of $\Delta t_o/20$ for the first stage. In the second stage, the uncertainty is again reduced by a factor of $\Delta t_o/20$ and by an additional factor of 2 by the OR gate 120 and AND gate 122 resulting in a maximum time uncertainty $\Delta t_o/800$. By this combination of two stages of ten pairs of OR and AND gates, each signal passes through a limited number of gates with a significant reduction in overall uncertainty.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimd are defined as follows:

1. An apparatus for reducing the maximum time uncertainty $\Delta t_o$ of a series of paired time signals representative of a series of single events, the series of paired signals varying at two terminals within a predetermined limit of $t_{max} - t_{min}$ with $t_{max} - t_{min}$ being equal to $\Delta t_o$, each pair of signals having a first signal $t_1$ and a second signal $t_2$ in order of time with $t_1 \leq t_2$ and $t_1 + t_2$ being equal to a constant, the apparatus comprising:

input means including the two terminals for providing the series of paired signals $t_1$ and $t_2$ with $t_1$ and $t_2$ varying between the terminals, output means, and circuit means interconnecting the input terminals to the output means, the circuit means including:

multiple time delays each less than $\Delta t_o$ and multiple logic means for progressively selecting the first-in-time and second-in-time of signals in signal pairs based on $t_1$ and $t_2$ or on $t_1$ and $t_2$ plus selected time delays with the time delays being selectively added to the first-in-time signals to progressively reduce the maximum uncertainty between the signals and shift the signals towards $t_{max}$.

2. The apparatus of claim 1 wherein the circuit means includes means for selecting signals $t_1$ from the paired signals $t_1$ and $t_2$.

3. The apparatus of claim 2 wherein the addition of the time delay to the signals $t_1$ occurs prior to the selection of signals $t_1$.

4. The apparatus of claim 2 wherein the addition of the time delay to the signals $t_1$ occurs after the selection of signals $t_1$.

5. The apparatus of claim 2 wherein the time delay is equal to about $\Delta t_o/2$.

6. The apparatus of claim 1 wherein the circuit means includes a plurality of stages with each stage including the logic means and means for adding the time delays, with the maximum limit between $t_x$ and $t_{max}$ being reduced by each stage and the value of the time delays also being reduced at each stage.

7. The apparatus of claim 6 wherein the stages form a series arrangement with the time delay for the first stage being equal to about $\Delta t_o/2$ and being reduced by a factor of 2 for each succeeding stage.

8. The apparatus of claim 6 wherein the stages form a parallel arrangement.

9. The apparatus of claim 8 wherein the means for adding a time delay adds the time delay to the signals from at least one of the terminals.

10. The apparatus of claim 1 wherein the circuit means includes at least one OR gate for selecting signals first-in-time and at least one AND gate for selecting signals second-in-time.

* * * * *